United States Patent [19]

Takashima

[11] Patent Number: 4,920,605
[45] Date of Patent: May 1, 1990

[54] ELECTRIC CLEANER

[75] Inventor: Yoshinori Takashima, Omihachiman, Japan

[73] Assignee: Matsushita Electric Industrial Co., Ltd., Osaka, Japan

[21] Appl. No.: 258,611

[22] Filed: Oct. 17, 1988

[30] Foreign Application Priority Data

Oct. 16, 1987 [JP] Japan .................................. 62-261088
Oct. 16, 1987 [JP] Japan .................................. 62-261089

[51] Int. Cl.⁵ .............................................. A47L 9/28
[52] U.S. Cl. ...................................... 15/319; 15/339; 15/412
[58] Field of Search .......................... 15/319, 339, 412

[56] References Cited

U.S. PATENT DOCUMENTS

| 4,021,879 | 5/1977 | Brigham | 15/319 |
| 4,601,082 | 7/1984 | Kurz | 15/319 |
| 4,680,827 | 7/1987 | Hummel | 15/319 |

Primary Examiner—Chris K. Moore
Attorney, Agent, or Firm—Wenderoth, Lind & Ponack

[57] ABSTRACT

An electric cleaner for use in households and/or industry, is provided with a control system for running the blower of the motor cleaner at a constant speed in spite of the speed set by a control unit when dust has not been detected by a dust sensor, and to effect an increase in the speed of the blower motor up to the speed set by the control unit when dust has been detected, whereby the electric cleaner is capable of effecting a cleaning operation quietly with its operational properties being improved.

2 Claims, 5 Drawing Sheets

ELECTRIC CLEANER

BACKGROUND OF THE INVENTION

The present invention relates to an electric leaner for use in households and/or industry.

In recent years, carpets are often used as a floor covering material. In order to suck up dust in the pile of the carpets, electric cleaners have been required to employ larger motors to create a larger suction power.

Furthermore, the speed of the blower motor contained within the electric cleaner, is selectively controlled by a control unit in the handle that is attached to the end of the flexible hose, in accordance with the material being cleaned so that the cleaning can be achieved with the appropriate suction-air volume to save electricity and minimize noise.

In another electric cleaner, a dust sensor is provided in the air channel between the suction opening and the dust collecting apparatus, and the speed of the blower motor is automatically increased upon the detection of the dust by the dust sensor.

Such a conventional electric cleaner will be described hereinafter with reference to the drawings.

FIG. 4 shows an electrical circuit diagram of a conventional electric cleaner, a variable resistor 1, installed in the control unit in the handle which is attached to the end of a flexible hose, is used to variably control the speed of the blower motor 2. A gate signal generated in the phase control circuit 3, is varied by the resistance value of the variable resistor 1. By means of the gate signal, a bidirectional thyristor 4 varies a conductive angle with respect to the blower motor 2 of the AC power supply 5, and thereby varies the speed of the blower motor 2. A pair of contacts employed in an electromagnetic relay 6 are closed upon receiving a dust detection signal transmitted from a dust sensor unit 7, so as to bypass the variable resistor 1. A current-limiting resistor 9 is for a light emitting diode 8 (hereinafter referred to as an LED). A phototransistor 10 is used to change the intensity of the light emitted by the LED 8 into a current variation. The dust sensor circuit 7 detects the above said current variation and outputs the dust detecting signal. A load resistor 11 is used for the phototransistor 10.

An electric cleaner as described above operates in a manner as described below.

To begin with, by the sliding of the knob 18 (see FIG. 6) which is connected to the variable resistor 1 built-in within the control unit in the handle 14, the electric current which is phase controlled by the phase control circuit 3, is supplied to the blower motor through the bidirectional thyristor 4 and the blower motor 2 rotates at the desired speed for the cleaning purposes.

In the case of this example, as the resistance value of the variable resistor 1 increases, the speed of the blower motor 2 goes down and if the resistance value of the variable resistor 1 becomes equal to zero, then the blower motor 2 runs at its maximum speed. Accordingly, by the operation of the variable resistor 1 in accordance with the material being cleaned, a suction-air volume suitable to the material being cleaned is obtained.

When the dust sucked in through the suction nozzle 12, passes through a dust sensor unit 17 (see FIG. 5) consisting of the LED 8 and phototransistor 10, the light emitted by the LED 8 is interrupted and does not reach the phototransistor 10. Then, the dust sensor circuit 7 energizes the electromagnetic relay 6 and the pair of contacts thereof are closed. Upon the closing of the contacts, the variable resistor 1 is bypassed and the blower motor 2 runs at its maximum speed. Furthermore, at a given time (e.g.—three seconds in the case of a conventional electric cleaner) after the dust passing through the dust sensor unit 17 is no longer present, the dust sensor circuit 7 turns off the electromagnetic relay 6, and the pair of contacts opens, and the speed of the blower motor 2 returns to the one originally established by the variable resistor 1. The operation pattern of the blower motor 2 is shown in FIG. 3(C).

However, in such a conventional construction as described hereinabove, when the dust is sucked in during the cleaning of a curtain with the knob 18 set to the position of "curtain", that is, the run the blower motor 2 at its minimum speed, the speed of the blower motor 2 suddenly goes up and reaches its maximum speed with the problems that the suction nozzle sucks in the curtain, thus resulting in an operational problem.

SUMMARY OF THE INVENTION

Accordingly, an essential object of the present invention is to provide an electric cleaner which employs improved maneuverability and cleans material quietly.

Another important object of the present invention is to provide an electric cleaner with a blower motor whose speed is continuously varied by the control unit installed in the handle, and a dust sensor unit located at the suction opening or between the suction opening and the dust collecting apparatus, and a control means. The above said control means, if no dust is detected, lowers the speed of the blower motor to a given level regardless of what speed selection is made at the control unit in the handle, and if dust is detected, it raises the speed of the blower motor up to the speed selected by the control unit. When no dust passes through the dust sensor unit in the above-described construction, the blower motor runs at a fixed speed regardless of what speed selection is made at the control unit in the handle. Also, when dust which is sucked in, is detected by the dust sensor unit, the speed of the blower motor is controlled by the control means and it goes back to the speed that is selected by the control unit in the handle.

Therefore, quiet cleaning may be effected at a constant low speed of the blower motor at the place where dust does not exist, while cleaning can be effectively achieved at a high speed selected at the control unit if dust exists on the material being cleaned. Particularly, in the case of cleaning curtains which require the blower motor to run at its lowest speed, when the dust on the curtain is detected, the motor speed only goes up to the lowest speed. Therefore, a drastic increase of the speed and noise of the blower motor, that occurs with a conventional electric cleaner, does not occur and the user is not surprised.

A further object of the present invention is to provide an electric cleaner with a control means which reduces the speed of the blower motor by a constant percentage as compared with the speed selected by the control unit in the handle when the dust has been detected by the dust sensor unit, and runs the blower motor at the speed selected by the control unit when dust has been detected.

When no dust has passed through the dust sensor unit in the above-described construction, the blower motor is driven at a speed reduced by a constant percentage as compared with the speed selected by the control unit in the handle. Also, when the dust has been detected by the dust sensor unit, the speed of the blower motor is controlled by the control means and it goes up to the speed selected at the control unit in the handle. Therefore, at a place where the dust is less, the blower motor runs at the speed that is lower than that selected and quiet cleaning can be effected. When the suction nozzle is moved to an area where more dust is located, the speed of the blower motor is switched back to the speed selected in the beginning by the control unit and the cleaning of the object can be effectively performed.

In addition, since the switching to the selected speed is effected at a constant percentage, the user is not surprised by a drastic increase of speed and noise that are experienced with the conventional cleaner during the cleaning of a curtain.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
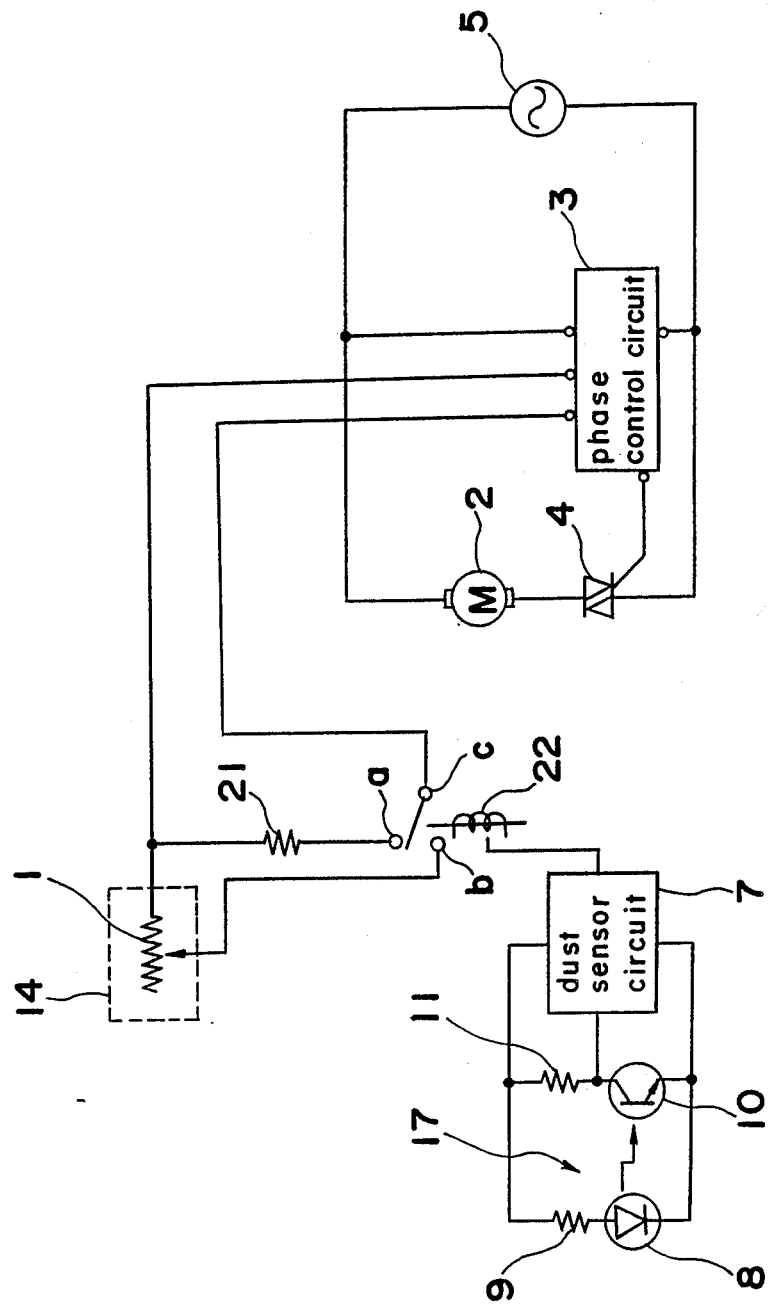
FIG. 1 is a circuit diagram of an electric cleaner in accordance with a first embodiment of the present invention.

Before the description of the present invention proceeds, it should be noted that like parts are designated by like reference numerals throughout the accompanying drawings.

The electric cleaner of the present invention is for use in households and/or industry, and is capable of cleaning objects quietly with an improved maneuverability. The cleaner is provided with a dust sensor unit located at the suction opening or between suction opening and dust collecting apparatus, and either a control means, which runs the blower motor at the given speed regardless of the speed selected by a control unit in the handle when dust has not been detected by the dust sensor and increases the speed of the blower motor up to the speed selected by the control unit in the handle when dust has been detected, or a control means which reduces the speed of the blower motor by a constant percentage as compared with the speed selected by the control unit in the handle when dust has not been detected by the dust sensor unit and which switches the speed back to the speed selected by the control unit in the handle when dust has been detected.

Referring now to the drawings, FIG. 1 shows a circuit diagram of an electric cleaner in accordance with one embodiment of the present invention. In FIG. 1, one end of a resistor 21 is connected to one end of a variable resistor 1 connected to a phase control circuit 3, while the other end of the resistor 21 is connected to a contact a of an electromagnetic relay 22; a contact b of the relay 22 is connected to a slider of the variable resistor 1; a common contact c of the relay 22 is connected to a phase control circuit 3.

The gate signal generated in the phase control circuit 3 is varied by the resistance value of the variable resistor 1. The bidirectional thyristor 4 varies a conductive angle with respect to the blower motor 2 of the AC power supply 5 based on the gate signal supplied by the phase control circuit 3, to vary the speed of the blower motor 2.

Upon receiving a dust detection signal from the dust sensor circuit 7, the electromagnetic relay 22 connects contact b to contact c and the variable resistor 1 is short-circuited. Also, a light emitting diode 8 (hereinafter referred to as an LED), a current limiting resistor 9 for the LED 8 and a load resistor 11 for a phototransistor 10 are provided. The phototransistor 10 receives light coming from the LED 8 and changes the intensity of light which is affected by the dust sucked in, to current variations and then, the dust sensor circuit 7 outputs a dust detecting signal through the detection of the current variation.

Figure 5:
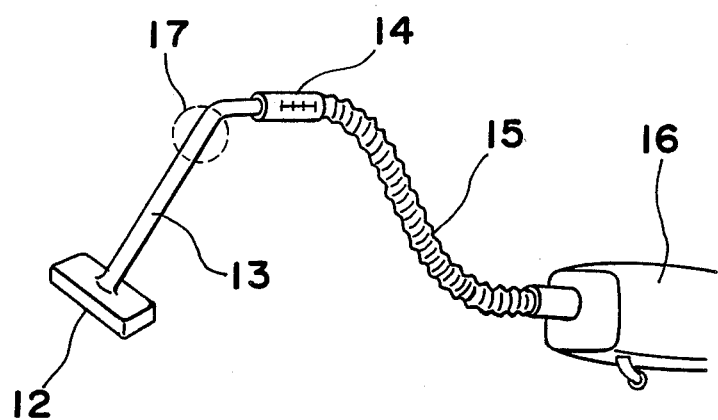
FIG. 5 is an overall view of an electric cleaner.

FIG. 5 is an overall view of an electric cleaner provided with a suction nozzle 12 for sucking the dust off the floor. The suction nozzle 12 is connected to a main body unit 16 employed with a blower motor 2 (not shown) and a dust collecting apparatus (not shown), through a pipe 13, a handle 14 and a flexible hose 15.

The control unit installed inside the handle 14, is used to vary the speed of the blower motor 2. A dust sensor unit 17 provided in the pipe 13 consists of the LED 8 and the phototransistor 10.

Figure 4:
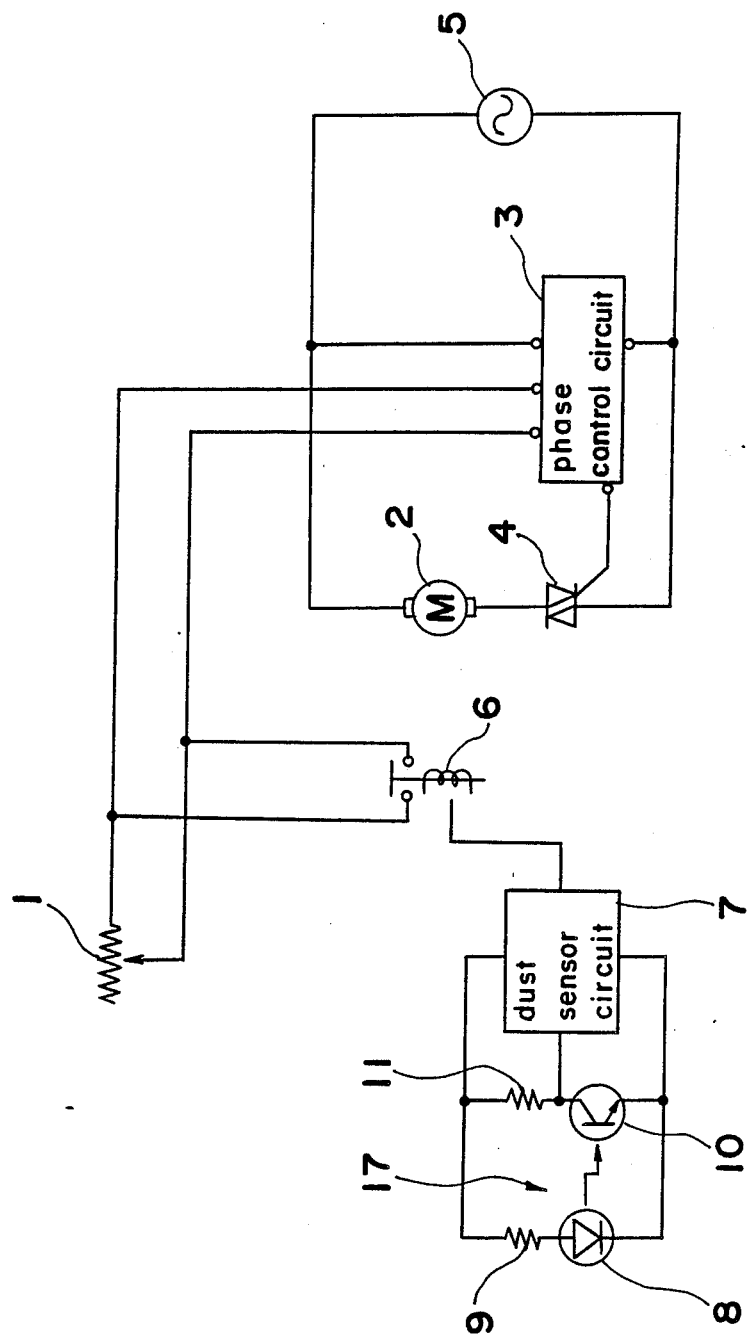
FIG. 4 is an electrical circuit diagram of a conventional electric cleaner.
Figure 6:
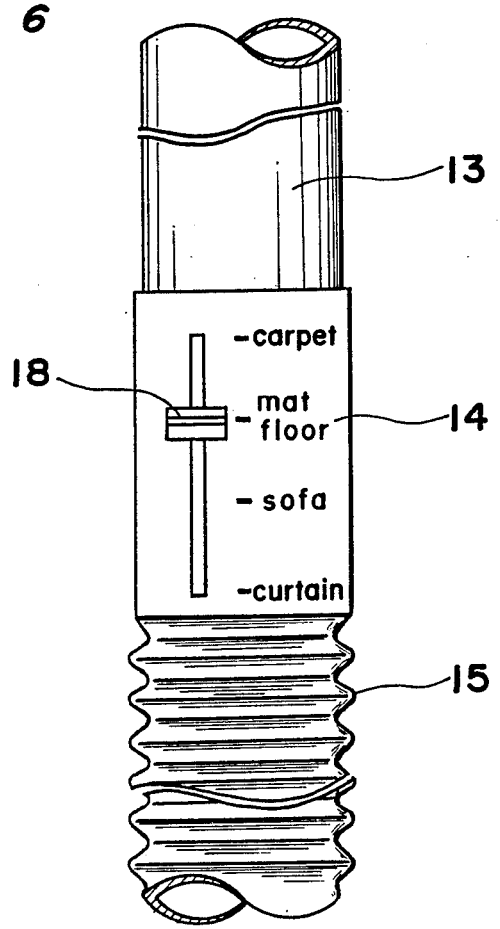
FIG. 6 is an enlarged view of a control unit employed in the electric cleaner of FIG. 5.

FIG. 6 is an enlarged view of the handle 14 shown in FIG. 5, wherein a knob 18 is coupled to a slider of the variable resistor 1 of FIG. 4.

The knob 18 is set to one of the positions, "carpet" to "curtain" depending upon the material being cleaned so that an appropriate speed of the blower motor 2 can be selected.

In FIG. 1, the variable resistor 1 is operated by the knob 18 to control the speed of the blower motor 2. If no dust passes through the dust sensor unit 17 during cleaning, the contact c of the electromagnetic relay 22 is connected to the contact a with which the resistor 21 is connected, and the blower motor 2 runs at the constant speed established by the resistor 21, since the variable resistor 1 is electrically disconnected from the circuit.

When the dust sensor unit 17 detects dust, the dust sensor circuit 7 sends a signal to the electromagnetic relay 22, and the contact c is switched to the contact b. Then the resistor 21 is electrically disconnected from the circuit and the variable resistor 1 is put back in the circuit. Namely, when the knob 18 is in the position of "floor" that the operator is trying to clean, the speed of the blower motor 2 is changed to the appropriate speed for the cleaning of floor.

Figure 3A:
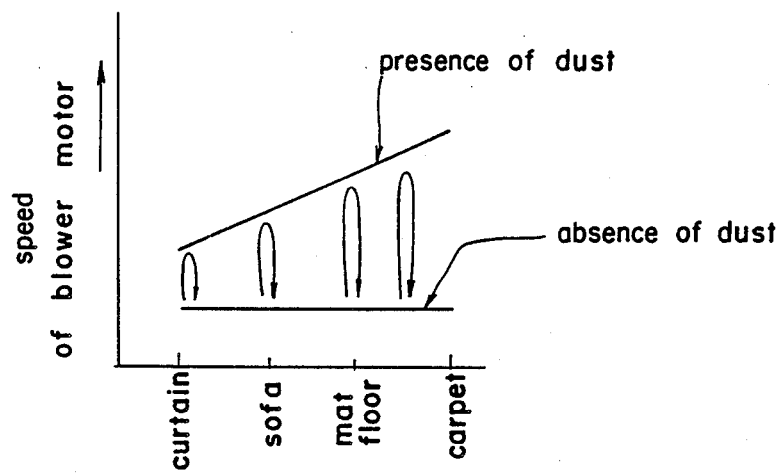
FIGS. 3(A) to 3(C) are graphs showing an operational pattern in the presence and absence of dust with respect to the electric cleaner of the present invention, FIGS. 3(A) and 3(B), and of a conventional electric cleaner, FIG. 3(C)

As a result, when the dust sensor unit 17 has not detected dust as shown in FIG. 3(A), the blower motor 2 runs at a constant low speed which is set by the resistor 21. On the other hand, when dust has been detected, the blower motor 2 runs at the speed selected by the control unit, in accordance with the object being cleaned.

Figure 3B:
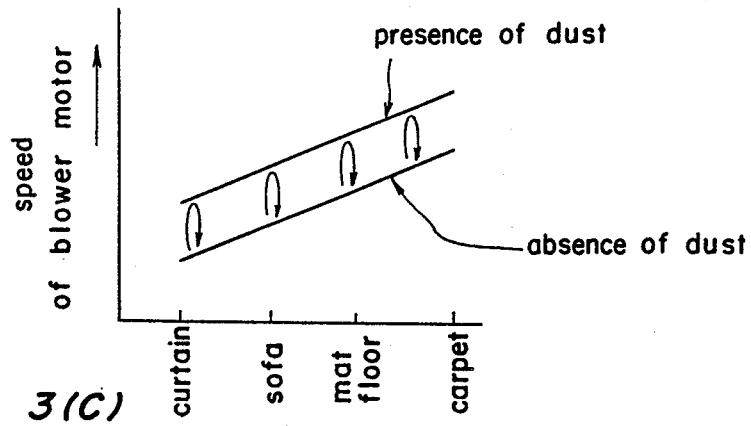
Figure 3C:
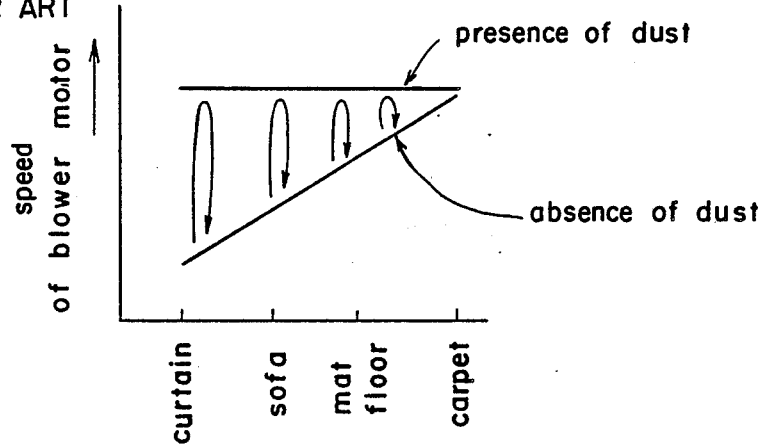

It is to be noted that the operational characteristics of the blower motor 2 shown in FIG. 3 (A) may be designed comparatively freely at a rate of the resistor value between the variable resistor 1 and the resistor 21.

Another embodiment of the present invention will be further described below.

Figure 2:
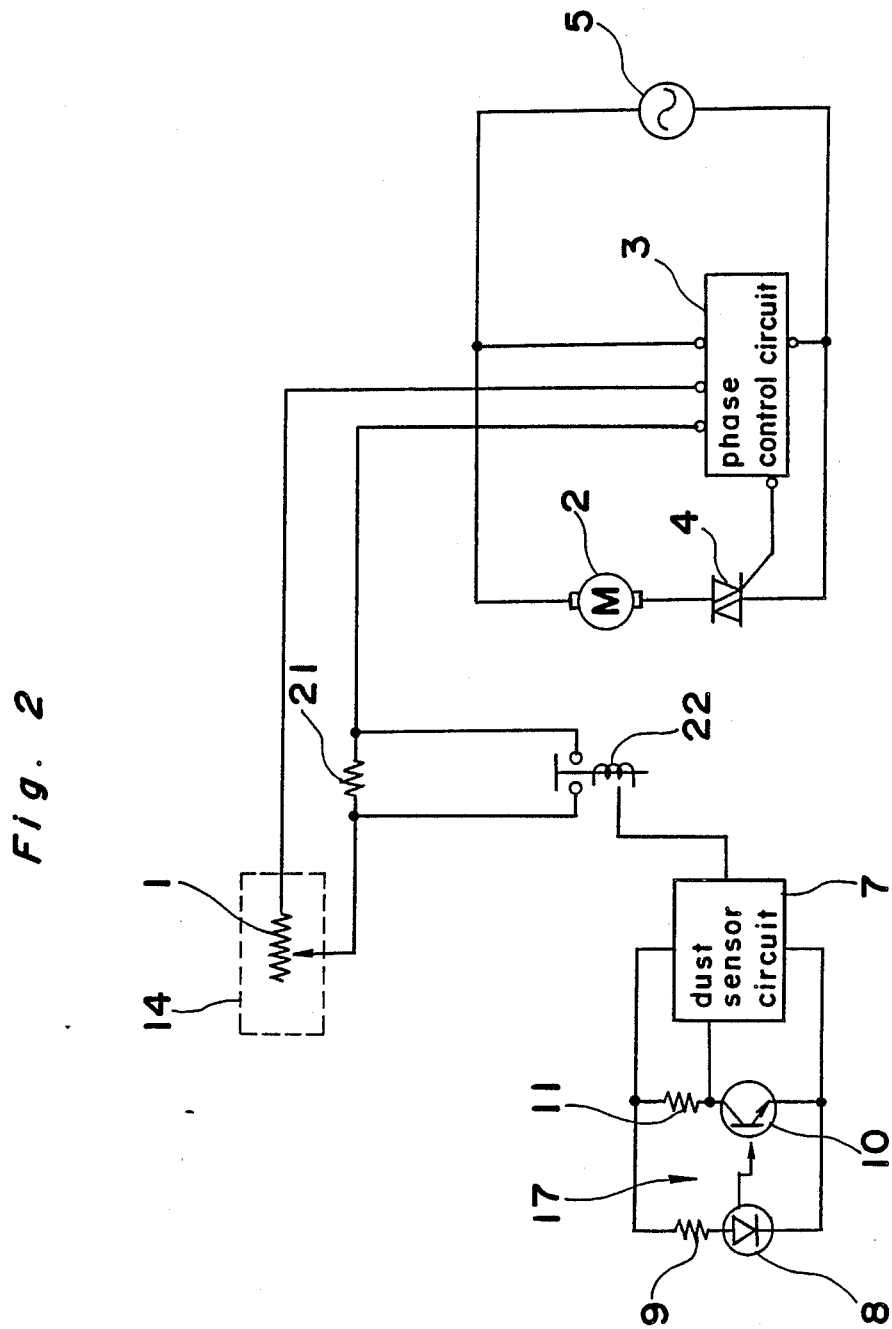
FIG. 2 is a circuit diagram of an electric cleaner in accordance with a second embodiment of the present invention.

Referring to FIG. 2, one end of the resistor 21 is connected to a phase control circuit 3 and the other end is connected to the slider of the variable resistor 1. A pair of contacts of the electromagnetic relay 22 are connected across both ends of the resistor 21.

The operation thereof will be described hereinafter.

In FIG. 2, the variable resistor 1 is operated to control the speed of the blower motor 2. When no dust passes through the dust sensor unit 17, the contacts of the electromagnetic relay 22 stay open. The combined resistance seen from the phase control circuit 3 is the sum of the variable resistor 1 and the resistor 21 since they are connected in series, and the speed of the blower motor 2 is reduced by a constant percentage as compared with the speed established only by the variable resistor 1 in the control unit.

When the dust sensor unit 17 detects dust, the electromagnetic relay 22 is activated by the signal coming from the dust sensor circuit 7, and the pair of contacts of the electromagnetic relay 22 are closed and the resistor 21 is bypassed.

Therefore the combined resistance seen from the phase control circuit 3 will only be that of the variable resistor 1. Namely, when the knob of the variable resistor 1 is located in the "curtain" position, "sofa" position, "mat" or "carpet" positions, the blower motor 2 runs at a speed which is suitable for the cleaning of each material.

As a result, when the dust sensor unit 17 has detected dust as shown in FIG. 3(B), the speed of the blower motor goes up to the speed determined by the resistance value of the variable resistor 1 in the control unit in the handle 14.

The operational characteristics of the blower motor 2 shown in FIG. 3(B) may be designed comparatively freely at the rate between the variable resistor 1 and the resistor 21.

Although, the present invention has been fully described in connection with the preferred embodiments with reference to the accompanying drawings, it should be noted that various changes and/or modifications are apparent to those skilled in the art. Such changes and/or modifications are to be understood as being included within the scope of the present invention as defined by the appended claims unless they otherwise depart therefrom.

What is claimed is:

1. An electric cleaner comprising a main body including a blower motor whose speed is continuously varied by a control unit, and a dust sensor unit provided in a suction opening or between a suction opening and the main body, and a control means for running the blower motor at a predetermined constant speed irrespective of the speed selected by the control unit in the absence of dust being detected by the dust sensor unit, and for increasing the speed of the blower motor up to a speed selected by the control unit when dust has been detected by the dust sensor unit.

2. An electric cleaner comprising a main body including a blower motor whose speed is continuously varied by a control unit, and a dust sensor unit provided in a suction opening or between a suction opening and the main body, and a control means for reducing the speed of the blower motor by a constant percentage as compared with the speed selected by the control unit in the absence of dust being detected by the dust sensor unit, and for running the blower motor at the speed selected by the control unit when dust has been detected by the dust sensor unit.

* * * * *